March 29, 1938.  F. CARL  2,112,689
MANUFACTURTURE OF SULPHURIC ACID BY THE CONTACT PROCESS
Filed Jan. 26, 1935
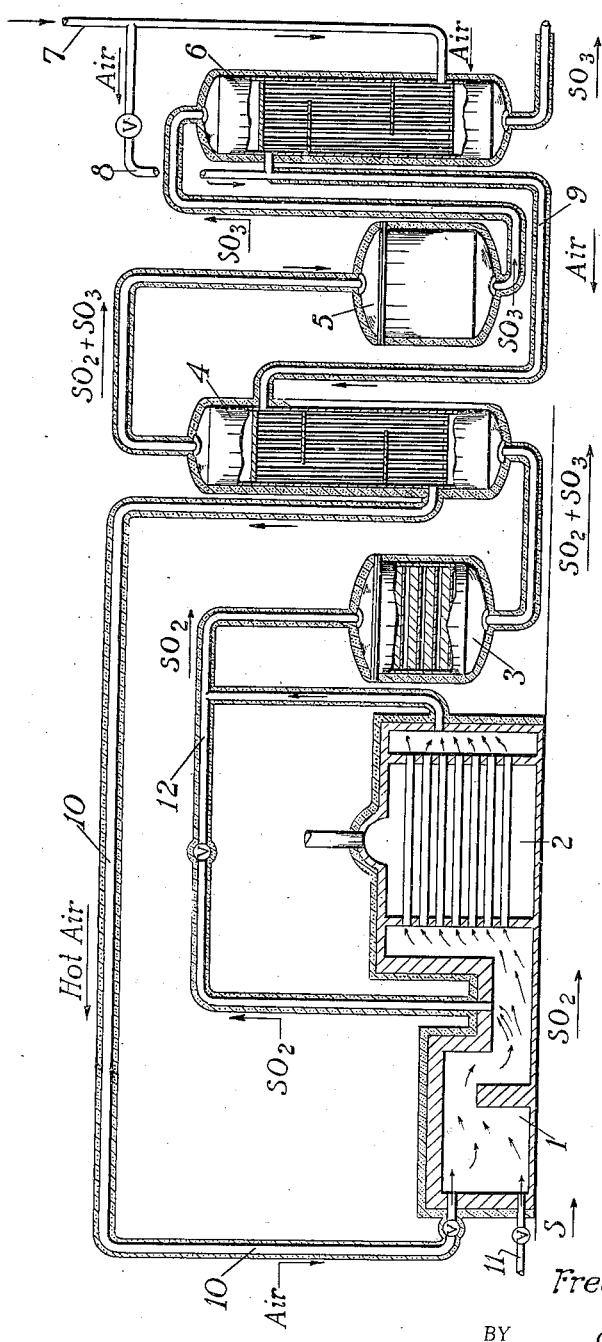
Fred Carl INVENTOR.
BY David Katz.
ATTORNEY.

Patented Mar. 29, 1938

2,112,689

UNITED STATES PATENT OFFICE 2,112,689

MANUFACTURE OF SULPHURIC ACID BY THE CONTACT PROCESS

Fred Carl, Wilmington, Del., assignor to E. I. du Pont de Nemours & Company, Wilmington, Del., a corporation of Delaware Application January 26, 1935, Serial No. 3,565

1 Claim. (Cl. 23—176)

This invention relates to an improved process and apparatus for the manufacture of sulphuric acid by the contact process. More particularly, my invention deals with the regulation of the temperature within the converter and with the cooling of the sulphur trioxide gases issuing from the converter, prior to their entry into the absorption tower, where they are absorbed in dilute sulphuric acid.

In the specification and claim below, when I speak of sulphur dioxide gases generally, I am referring to the mixture of gases produced in the combustion chamber and containing as principal ingredients sulphur dioxide, oxygen and nitrogen. When I speak of sulphur trioxide gases, I am referring to the mixture of gases issuing from the "converter" or "contact-chamber", and consisting principally of sulphur trioxide, nitrogen, excess air, and sometimes unreacted sulphur dioxide.

The contact-process of producing sulphuric acid is well known in the art, and has been developed into a great many systems or modifications. Some of these start with iron pyrites as raw material. Others use brimstone, or crude sulphur. My present invention is particularly concerned with the processes of the latter type.

In all of these systems, the raw material is burned in a combustion chamber, which has at this stage undergone development into a great many modifications. The combustion gases consisting principally of nitrogen, sulphur dioxide and oxygen are then cooled to an optimum temperature for conversion into sulphur trioxide, usually around 325 to 425° C., and are passed on into a converter, or contact chamber, where they come in contact with catalytic mass, usually platinum suitably supported on a carrier. The catalyst promotes the reaction between the $SO_2$ and oxygen within the incoming mixture, and produces $SO_3$. Considerable heat is developed during this stage which must be conducted away for best practical effects, since at higher temperatures the $SO_3$ tends to decompose back into $SO_2$ and oxygen. The sulphur trioxide gases issuing from the converter must be cooled for the further reason that their absorption in sulphuric acid is more efficient at lower temperatures than at a higher one.

Many systems have been developed in the art for accomplishing each stage of the above continuous process in general, and the last stage in particular.

In a system known as Badische, two converters are used in series, with a heat exchanger following each converter. (See for instance, Bulletin 184 of the U. S. Bureau of Mines, compiled by Wells and Fogg, 1920.) In this system, the sulphur trioxide gases issuing from the first converter, and still containing a considerable amount of $SO_2$, are passed through a heat exchanger where they are brought in thermal contact with a relatively cool counter stream of sulphur dioxide gases; the cooled gases then proceed into the second converter, where further conversion of $SO_2$ to $SO_3$ takes place, and then through a second heat exchanger wherein they are likewise met by a counter current of relatively cool sulphur dioxide gases.

The heat exchange, however, in this system is incomplete, and it is impractical by this method to cool the final sulphur trioxide gases below about 250° C. Consequently, the cooled gases have to be passed further through radiators or coolers to reduce their temperature to the desired low degree.

In another system, air is used as the cooling medium throughout, but the heat absorbed by it is wasted.

It is accordingly an object of my invention to provide a process and apparatus for regulating the temperature of the sulphur trioxide gases issuing from the converter, which is characterized by both flexibility and heat economy.

Another object of my invention is to provide a system wherein the apparatus for cooling of the $SO_3$ gases from the converter cooperates with the apparatus for cooling the $SO_2$ gases from the combustion chamber, to produce a maximum economy and conservation of the heat stored in both.

A still further object is to provide a system possessing means for ready and easy control of the temperature within the converter and of the final temperature of the sulphur trioxide gases.

A still further object of my invention is to provide a system wherein the excess heat in the reaction gases is converted into useful steam energy.

Other and further important objects of this invention will appear as the description proceeds.

The means by which this combination of desirable ends is accomplished will be best understood by reference to the annexed drawing which is hereby made a part of this description. In this drawing, the figure represents diagrammatically a flow sheet of apparatus by which my process is carried out, the arrows indicating the direction of flow.

In this figure, 1 is a combustion chamber operating under superatmospheric pressure and supplied with powdered or molten sulphur under pressure through valved line 11, and with hot, dry air through valved line 10. The valves on these lines permit a regulation of both the amount and proportions of these raw materials. 2 is a fire-tube boiler, though other types of steam generators may be used without departing from the spirit of my invention. This boiler is equipped with the usual auxiliaries of a steam boiler (not shown). The hot gases from the combustion chamber flow through the fire-tubes in this boiler, and the flow is so proportioned that under full operation of the plant it will deliver a gas whose temperature is lower than the optimum required for the gases entering the first converter. 3 is a converter containing a catalytically active mass, and 4 is a heat exchanger. 5 is another converter and 6 is a final heat exchanger. Additional stages of converter and heat exchanger may be installed if desired. The flow lines will be described in connection with a description of the operation.

To operate my process, molten sulphur and hot, dry air are supplied to the combustion chamber 1 in regulable amount and combine to form a mixture of sulphur dioxide, oxygen and nitrogen, which passes into the boiler setting 2 at high temperature. In general I prefer to regulate the combustion so that this gas contains 8 to 10% sulphur dioxide, by volume, though this composition may be greatly varied without departing from the spirit of my invention. In the boiler setting 2 the gas is cooled to about 250° C., the steam generated thereby being passed into the plant mains or used for any other useful purpose such, for example, as driving the various pumps, blowers, etc., used around the sulphuric acid plant. By means of the valved by-pass line 12, through which hot gas from the combustion chamber is passed, the temperature of the gas leaving the boiler is brought up to a temperature suitable for catalytic conversion, say about 325° to 425° C., and is passed into converter 3. In this converter, the greater portion of the $SO_2$ in the mixture is converted to $SO_3$, (from about 60% to about 80%), and the gas temperature rises (usually by about 150 to 225° C.).

The hot gas leaving this converter is passed to heat exchanger 4 where its temperature is again reduced to a point suitable for entering the second converter 5, the cooling medium being the air subsequently used in the combustion chamber. After passage through converter 5, where another temperature rise occurs, much milder than in the first converter, the gas passes to the final heat exchanger 6, where it gives up most of its excess heat to the air supplied to the system. The exit gas from this exchanger, now containing nearly all of its sulphur in the form of $SO_3$, is passed to a conventional absorption system.

Through pipe 7 dry air, at essentially atmospheric temperature is supplied to the system under pressure. By means of the valved by-pass 8, enough of this air is passed into line 9 to maintain the proper temperature in the gas entering converter 5. The control here is simple and easy. The more air is passed through this line, the lower will be the temperature of the gas entering converter 5. The balance of the air from pipe 7, which constitutes its greater part, passes through exchanger 6, cools the sulphur-trioxide-laden gas from the converter system, and is thereby raised in temperature. The partly heated air, whose temperature is regulated as just described, entering exchanger 4 is further heated therein and cools the gas leaving converter 3 prior to its entry into converter 5. This heated air leaving exchanger 4 is then conducted into the combustion chamber through pipe 10, and used in the burning of the sulphur in said combustion chamber. It contains a larger part of the heat evolved upon the conversion of the $SO_2$ to $SO_3$, and adds this heat to that generated in the combustion chamber when the sulphur burns to $SO_2$. This results in an appreciably higher flame temperature in the combustion chamber, the increase being of the order of 400° C. higher. This increase not only facilitates the burning of the sulphur, but it permits more efficient recovery of this heat in the form of steam when this superheated gas is passed into the boiler. It will be obvious that all parts of the system, including the connecting pipes, should for best economy be well insulated against the loss of heat.

By this method of operating, a large part of the heat generated in the system, not only from the combustion of the sulphur, but also from the subsequent oxidation of the sulphur dioxide, is recovered in the form of high pressure steam, and the gas containing sulphur trioxide is delivered to the absorption system at a sufficiently low temperature, say about 50° C., so that no further cooling thereof is necessary. Moreover, by arranging the apparatus as shown, whereby the air travels successively through the various heat exchangers, in counter-current relation to the converter gases, and by the provision of suitable by-passes for the air, the temperature regulation at every point in the system becomes greatly facilitated, and the efficiency of heat recovery may be brought to a maximum. Finally, the apparatus by which this is accomplished is less costly and more compact than the apparatus formerly used, in which the heat of reaction was dissipated to the air or to cooling water which ran to the sewer.

It will be understood that my preferred system of operation and apparatus employed may be varied and modified within wide limits, without departing from the spirit of this invention. Thus, in lieu of a liquid sulphur burner, a powdered sulphur burner may be used, or one of those types in which the sulphur is liquefied locally just prior to combustion. Instead of a fire-tube boiler, any suitable type of steam generator may be applied. Its tubes may be made of the usual materials for steam boilers, for instance, steel, since at the high temperature of the $SO_2$ gases no condensation of acid and subsequent corrosion take place. (See further U. S. Patent No. 1,545,381).

Instead of two converter-heat-exchanger stages in series, any number of stages may be installed. The efficiency of conversion generally increases with the number of stages, but so does also the cost of the installation.

A pack filter may be interposed, if desired, between the sulphur dioxide cooler (i. e. the steam generator) and the first converter. When dry conditioned air is used, this will generally be unnecessary. But where conditioned air is unavailable or impractical, the filter will, by removing dust particles and impurities, prolong the active life of the catalytic mass inside the converters.

The heat exchangers may be of the conventional design, or of any optional special design. It is understood, of course, that the counter current gases in the heat exchangers flow in separate channels without physical contact, but the walls of the tubes of flow are made of heat conducting material, for instance iron, and serve to establish the desired thermal contact.

Many other variations and modifications will be apparent to those skilled in the art.

I claim:

In a contact process apparatus for the manufacture of sulphuric acid, the combination of a sulphur combustion furnace having associated therewith a boiler for heat recovery, a first converter, a first heat exchanger, a second converter, and a second heat exchanger, conduits so arranged therebetween that the oxidized sulphur gases will pass through the converters and heat exchangers in the above order, an inlet conduit for cooling-air to said second heat exchanger, an unobstructed conduit for cooling-air between said second heat exchanger and said first heat exchanger, a by-pass conduit for cooling-air extending from said inlet air conduit around said second heat exchanger to the air conduit between said heat exchangers, a valve in said by-pass, an unobstructed air conduit extending from said first heat exchanger to the combustion space of said furnace, the conduits otherwise providing an unbranching passage for the air through the heat exchangers, in which it is in indirect heat exchange with the oxidized sulphur gases, to the combustion space of the furnace.

FRED CARL.